United States Patent
Occhipinti

Patent Number: 5,581,959
Date of Patent: Dec. 10, 1996

[54] BENDABLE DRIP CAP

[76] Inventor: Vincenzo J. Occhipinti, 23 Hewson Ave., Waldwick, N.J. 07463

[21] Appl. No.: 423,705

[22] Filed: Apr. 18, 1995

[51] Int. Cl.[6] .................................................... E04D 1/36
[52] U.S. Cl. ................................. 52/58; 52/97; 52/198
[58] Field of Search ............................ 52/58, 97, 716.2, 52/198, 85; 285/42–44, 424

[56] References Cited

U.S. PATENT DOCUMENTS

| | | |
|---|---|---|
| 1,950,519 | 3/1934 | Ripley . |
| 2,912,078 | 11/1959 | Kiehl et al. . |
| 3,008,273 | 11/1961 | Widin . |
| 3,132,445 | 5/1964 | Swanson . |
| 3,159,252 | 12/1964 | Cotts . |
| 4,265,058 | 5/1981 | Logsoon ............................ 52/58 |
| 4,563,846 | 1/1986 | Webb . |
| 4,663,905 | 5/1987 | Schulz . |
| 4,750,301 | 6/1988 | Croxford ............................ 52/58 |
| 4,928,443 | 5/1990 | Goodman et al. ................. 52/58 |
| 4,966,819 | 10/1990 | Schatz et al. .................. 52/58 X |
| 5,072,552 | 12/1991 | Sauder . |
| 5,222,334 | 6/1993 | Hasty .......................... 52/58 X |
| 5,247,769 | 9/1993 | Becker . |
| 5,317,845 | 6/1994 | Bodycomb ..................... 52/58 X |
| 5,321,921 | 6/1994 | Holt . |

FOREIGN PATENT DOCUMENTS

3023037  1/1982  Germany ................................ 52/58

Primary Examiner—Carl D. Friedman
Assistant Examiner—Beth A. Aubrey
Attorney, Agent, or Firm—Klauber & Jackson

[57] ABSTRACT

A bendable drip cap material fabricated of polyvinyl chloride or similar thermoplastic polymeric material has corrugated flanges adjacent the drip cap strip which permit portions of the material to be bent and secured in place atop any rounded window frame or the like.

23 Claims, 8 Drawing Sheets

BENDABLE DRIP CAP

BACKGROUND OF THE INVENTION

The present invention pertains to drip cap protecting the tops of architectural projections from building walls, such as frames for windows, doors, moldings, vents and the like.

Such architectural projections require protection by drip cap to prevent water damage, which can cause rotting and other deterioration. Customarily, drip cap is attached to the sheathing of a structure by one flange, usually with galvanized nails, with the other flange protecting a window frame or the like. Building paper is then usually applied over the vertical flange and the sheathing, and suitable siding is applied over the paper, fitting snugly against the central strip of the drip cap material.

Holt's U.S. Pat. No. 5,321,921 discloses an "improved architectural radius drip cap method of sealing rounded window assemblies to exterior walls," using a metallic multi-flanged radius drip cap. To permit bending into the finished radius, the larger (outer) flange of the drip cap stock is notched or slitted, which spaces must be filled with caulking in the installation, and the smaller (inner) flange is periodically crimped. Such drip caps can be produced to fit half round or quarter round windows of various radii. Such a method required excessive time and labor, and the caulking used requires periodic maintenance or it will deteriorate.

U.S. Pat. No. 4,563,846 discloses the use of rigid vinyl flashings to seal arcuate window assemblies against exterior walls. The flashing is formed with pre-placed nailing holes for installation, which may cause leaks if left unused. This method pertains to vinyl-clad window assemblies rather than architectural wood products without such cladding.

U.S. Pat. No. 5,072,552 discloses a corner flashing that is corrugated so that it can be bent to conform to desired shapes to protect roof flashing corners.

U.S. Pat. No. 4,663,905 discloses a rubber flashing for skylights which has corrugated sides.

U.S. Pat. No. 3,132,445 discloses a plastic flashing for roofs.

U.S. Pat. No. 5,245,769 discloses a molding which contains slits which allow it to be configured to fit curved surfaces of acoustical ceiling tiles.

U.S. Pat. No. 3,008,273 discloses preformed arch structures for rounded openings and methods of making same from plasterboard stock. Such structures are unsuitable for exterior use.

U.S. Pat. No. 2,912,078 and Ripley's - U.S. Pat. No. 1,950,519 disclose straight ridged drip cap in general, for rectangular windows only.

While a variety of materials are available to provide drip caps for the upper surfaces of architectural features such as window and door frames and the like, to provide effective caps for upper rounded surfaces of such features has tended to be difficult and expensive. For example, the radius drip caps of Holt, supra, are contoured only for half or quarter round windows of specified radii, and require complicated procedures for both production and installation. In contrast, to order custom rounded drip caps sized and fitted for each window and/or door is very costly and time-consuming, although producing a superior installation. (See e.g. U.S. Pat. No. 4,536,846). Storing and transporting arcuate drip caps can be inconvenient due to their dimensions and sensitivity to being bent out of shape. On the other hand, if lengths of drip cap stock (perhaps 8 to 10 feet long) are provided to be bent into shape during installation, these lengths of material are also inconvenient to store and transport. There is clearly a need for a material for forming drip caps of various shapes and sizes which is convenient to store and transport and can be easily formed and installed on the construction site.

SUMMARY OF THE INVENTION

Accordingly, it is an object of this invention to provide bendable or flexible drip cap material which can be easily transported, stored and installed on architectural projections such as window or door frames which are straight, have polygonal shapes made up of intersecting straight lines or have typical curved surfaces, including even compound curves.

This object includes the protection of the upper surfaces of such wood projections, including trim boards, vents, moldings and the like to prevent water damage or leakage. A further object is to prevent rotting and other damage which can result from water leakage and infiltration into window frames and other structural components. Another object is to provide drip cap material which can be produced in suitable colors for direct use and/or painted to match the structural background. Still another object is to provide drip cap material which can be easily stored and transported.

In accordance with the present invention, these objects are achieved by a dual-flanged bendable or flexible drip cap for attachment to a vertical building wall or sheathing, comprising a smooth strip of bendable material and integral therewith a pair of flanges of unequal size projecting in opposite directions at 90 degree angles or greater, these flanges being of corrugated form to facilitate bending of said drip cap. The strip is preferably wide enough and is adapted to fit and cover the projecting architectural feature for which the drip cap is required. The strip can be slightly wider than the architectural feature, so that the smaller front flange avoids touching the outer wall. The smaller flange is adapted to fit over a portion of the vertical surface of the projecting architectural feature, protecting it from water flow. Preferably the smaller flange makes an obtuse angle with the strip, allowing it to make a small acute angle with the vertical wall surface when installed so as to direct water flow away from the wall. The larger flange is adapted to attach to the building wall and/or sheathing. While the bendable drip cap material of the invention may be applied to any architectural projection needing a drip cap, it is particularly advantageous for capping window and door frames, wood vents and moldings. The drip cap can be installed by nailing, stapling or screws (or other suitable attachment means) on rectangular windows as well as half-round or polygonal windows or windows having any suitable architectural curvature.

Further embodiments of the invention thus include methods for installing the bendable drip cap material of the invention by cutting a section of the drip cap material to size to fit a top surface of a projecting architectural feature such as a rounded window or door frame, then attaching the end thereof to one side of the top surface with attachment means, progressively bending the drip cap into position and securing the bent portion with attachment means until the entire portion of drip cap is securely installed to cover the top surface of the feature.

Further in accordance with the invention, a method for fabricating the bendable drip materials described above includes steps of:

(a) forming a strip of a suitable thermoplastic polymeric material having sufficient width to form a central strip and two flanges for drip cap material of a specified size and long enough to form a coil of said material;

(b) heating said thermoplastic material to a suitable softening temperature;

(c) passing said strip between interlocking contra-rotating forming wheels to form two flanges extending in opposite directions from a central strip of a drip cap, each forming at least a 90 degree angle to said central strip;

(d) thereafter, maintaining the thus-formed drip cap material at a suitable softening temperature and passing the flanges thereof between two sets of interlocking contra-rotating cog wheels to form corrugations in each of said flanges; and preferably, (e) coiling and cutting the thus-formed corrugated drip cap for storage or shipment.

These and other objects, features and advantages of the invention will become apparent from perusal of the following detailed description, including the drawings and the appended claims.

BRIEF DESCRIPTION OF THE DRAWINGS

A preferred embodiment of the invention is illustrated by the following drawings, in which.

DETAILED DESCRIPTION OF THE INVENTION

Figures 1, 2:
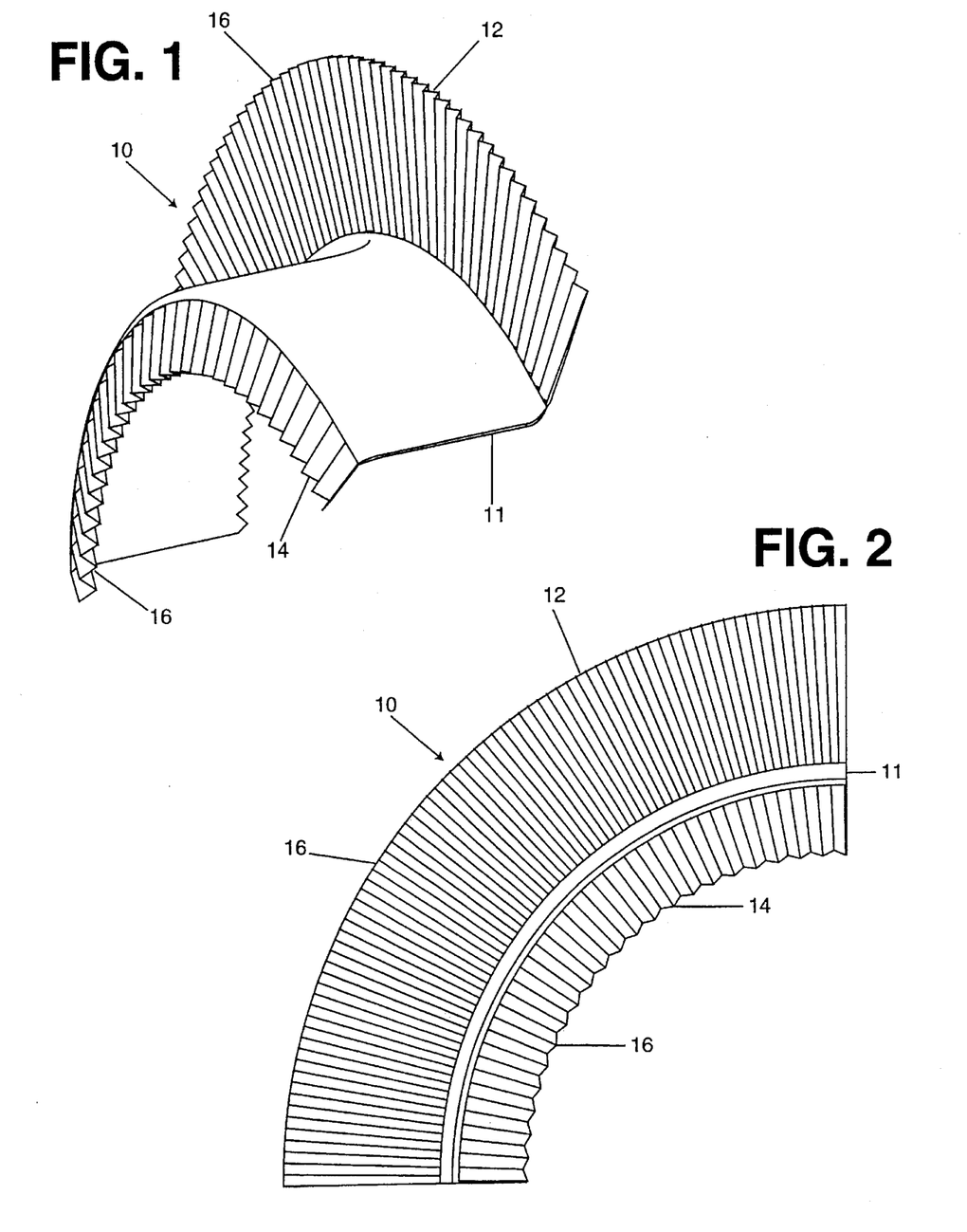
FIG. 1 is a perspective view of a bent drip cap in accordance with the invention.
FIG. 2 is a from view of the bent drip cap of FIG. 1.
Figures 3, 4, 5, 6:
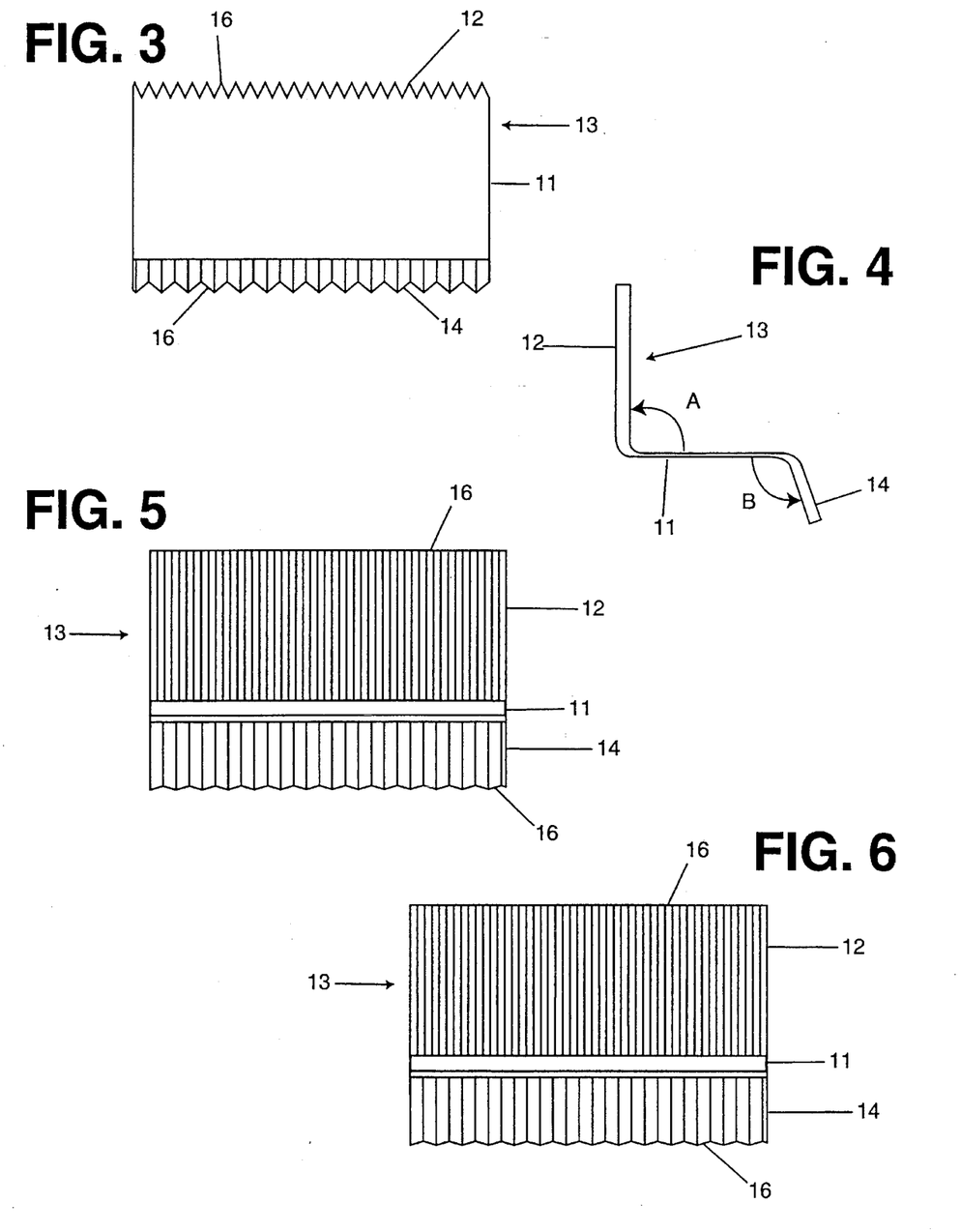
FIG. 3 is a top view of a section of the bendable drip cap material of the invention.
FIG. 4 is a right side view of the bendable drip cap material of FIG. 3.
FIG. 5 is a back view of the bendable drip cap material of FIG. 3.
FIG. 6 is a front view of the bendable drip cap material of FIG. 3.
Figure 7:
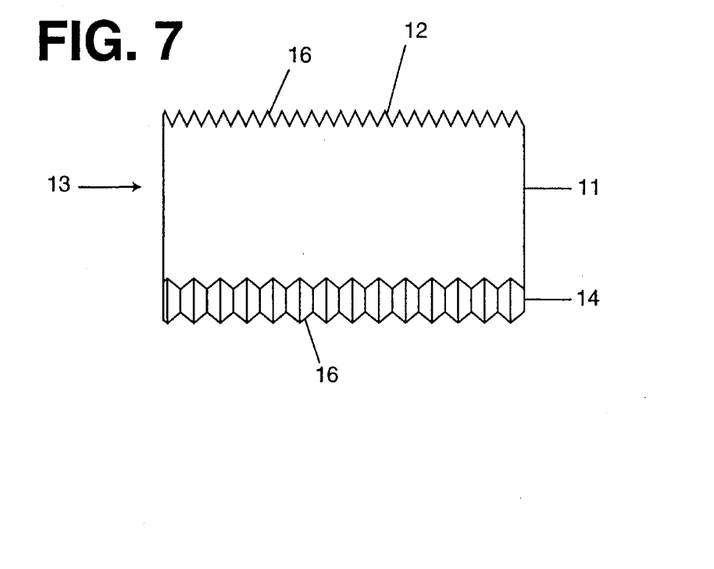
FIG. 7 is a bottom view of the bendable drip cap material of FIG. 3.

Turning now to the drawings, FIGS. 1 and 2 illustrate a length of bendable drip cap in accordance with the invention which has been bent into an arcuate drip cap (10). The larger, rear flange (12) is intended to be fastened to a building wall or sheathing and the smaller, front flange (14), which extends in the opposite direction from the central strip (11), is adapted to fit over the front of a window frame or the like, e.g. a half round or "circlehead" window. Both flanges are corrugated (16) to facilitate the bending of the drip cap stock into shape, with the larger flange having smaller corrugations than the smaller flange. Since the bendable stock is bent with the smaller flange inward, these larger corrugations are compressed, while the smaller, outer corrugations expand as the stock is bent. Depending upon the method of fabrication, the corrugations (16) can have a sawtooth form as illustrated in FIGS. 3 and 7, or a sinusoidal form.

FIGS. 3 to 6 illustrate an unbent length (13) of the bendable drip cap of the invention, showing in the various views the orientation of the central strip (11) and the larger flange (12) and smaller flange (14) extending from same in opposite directions. Although the size and proportions of these components are not critical, generally the central strip (11) is sized to at least cover the window frame or other projection which is to be capped, preferably allowing the outer (smaller) flange (14) to clear the vertical surface of the structure. Thus, the strip may range from about ½ to about 2 inches in width, and for a typical wood window frame, should be about 1¼ inches wide. A ¾ inch drip cap will fit window wood trim and a 1⅝ inch cap will fit most aluminum and vinyl windows. A 1¼ inch cap is also a useful size. The flanges (12) and (14) form angles of at least about 90 degrees with the central strip (11). Preferably, as shown best in FIG. 4, the larger flange (12) forms an angle (A) of about 90 degrees to strip (11) to facilitate a good fit between the sheathing of the structure and the surface of the architectural projection to be protected. The smaller flange (14) preferably forms an obtuse angle (B) from about 100 to about 110 degrees, or about 105 degrees, to the central strip (11) to permit it to clear the vertical surface of the structure and conduct water away from the structure.

To facilitate bending of the drip cap with the resultant compression of the inner flange's corrugations and the expansion of the outer flange's corrugations, the corrugations are approximately inversely proportional to the widths of the flanges. That is, the corrugations in the larger (outer) flange are smaller than those in the smaller (inner) flange. The corrugations can be any width which allows the flanges to compress and expand, but generally the corrugations of the larger flange can range from ¹⁄₂₀ to about ³⁄₁₆ inch, preferably about ¹⁄₁₆ inch to about ⅛ inch, while the corrugations of the smaller flange can range from about ¹⁄₁₀ to about ¼ inch, preferably about ⅛ to about ³⁄₁₆ inch. These measurements are taken from peak to peak of the corrugations before the drip cap is bent.

Figure 8:
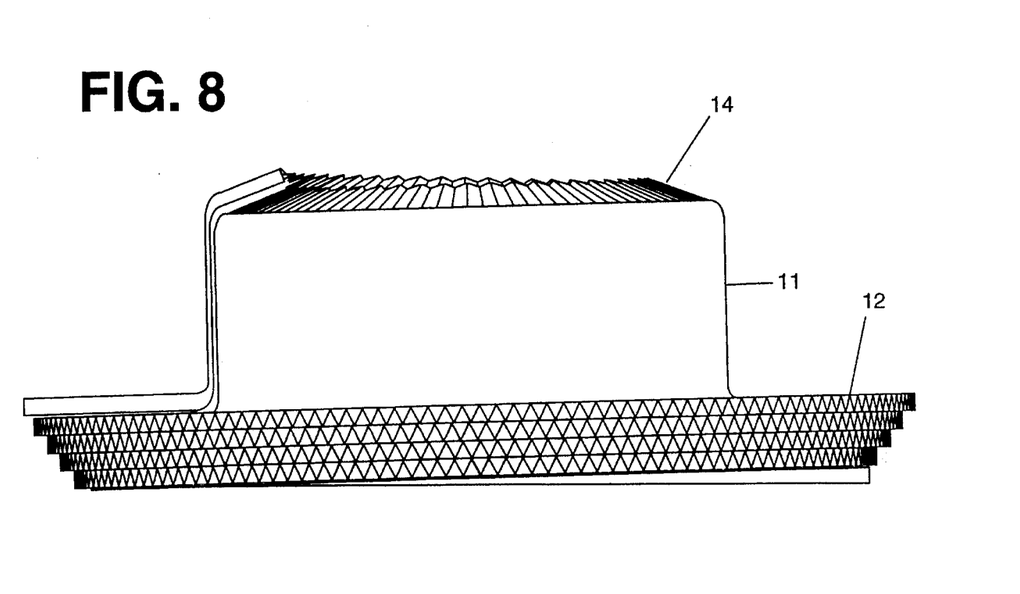
FIG. 8 is a side view of a length of such bendable drip cap coiled for storage or transport.
Figure 9:
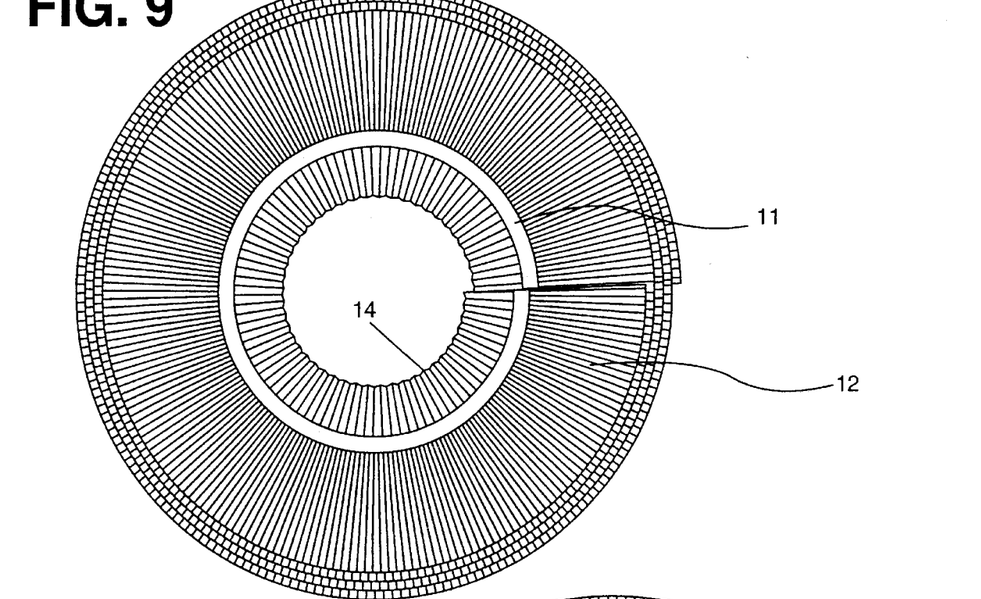
FIG. 9 is a bottom view of the coiled drip cap material of FIG. 7.
Figure 10:
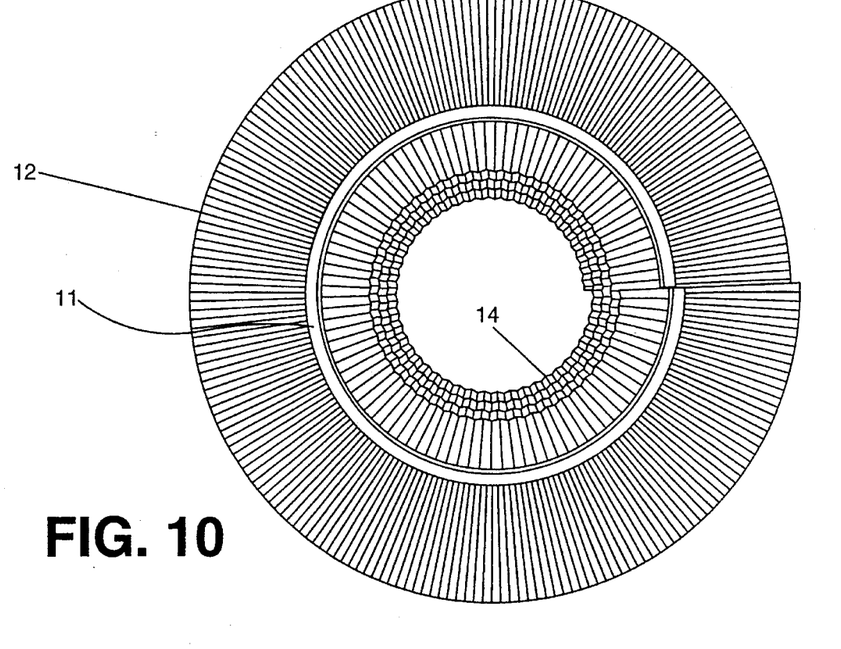
FIG. 10 is a top view of the coiled drip cap material of FIG. 7.

An advantage of the present invention is that significant lengths (up to about 50 feet) of the bendable drip cap can be coiled for storage and/or transport, as shown in FIGS. 8, 9, and 10. This avoids a requirement for storage of lengthy pieces of drip cap which must be protected from premature bending or other damage. The coiled material is easy to install on site. The drip cap is recommended for wood, aluminum, and vinyl windows. On wood windows the drip cap prevents wood rot, and on the wood trim it prevents wood rot and plywood warping. On aluminum windows the drip cap prevents seam leaks and jumps the nailing flange, and on vinyl windows the drip cap jumps the perforated nailing flange.

Figure 11:
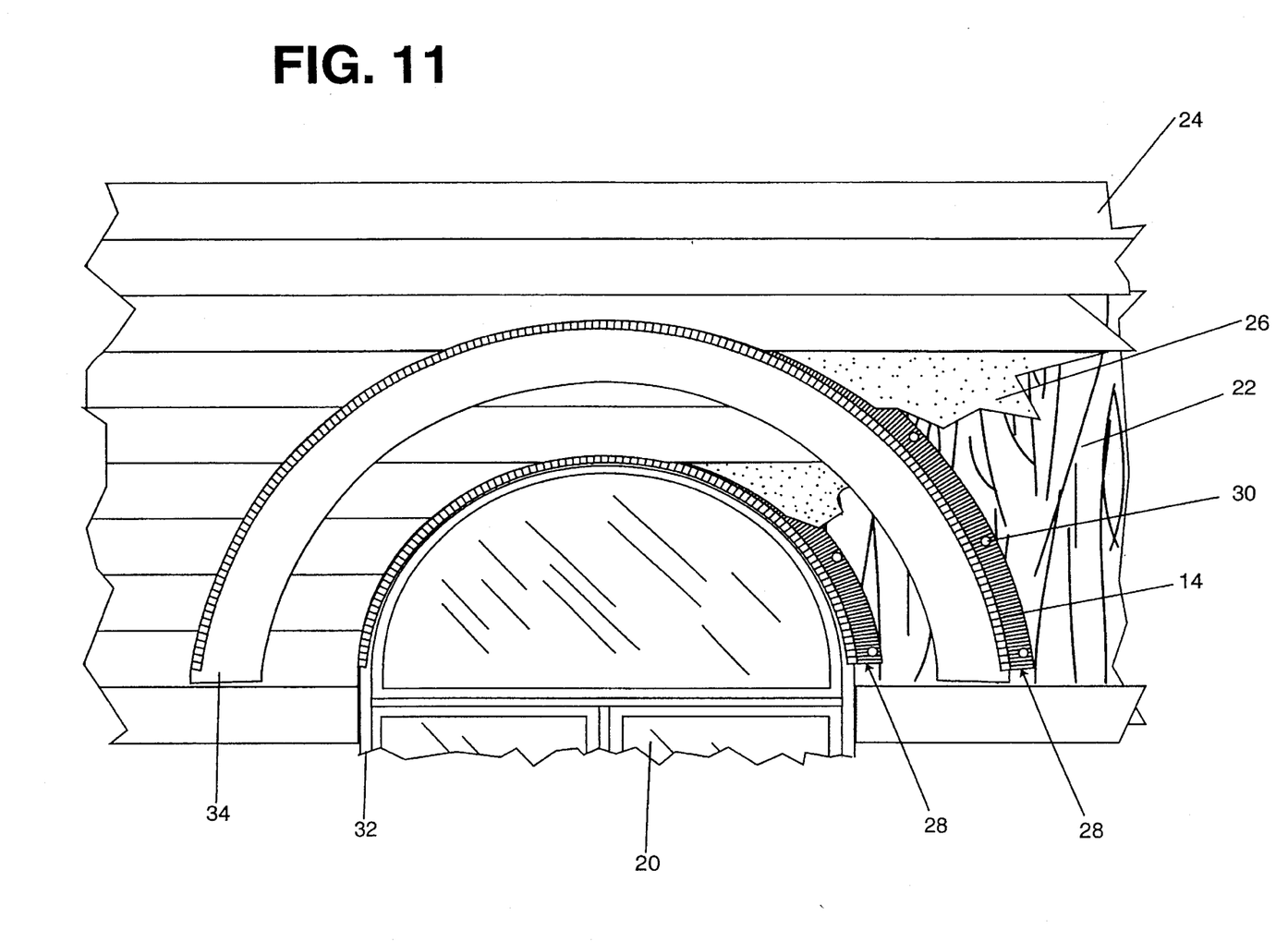
FIG. 11 is a front view of the bendable drip cap of the invention installed on a half round or "circlehead" window frame.
Figure 12:
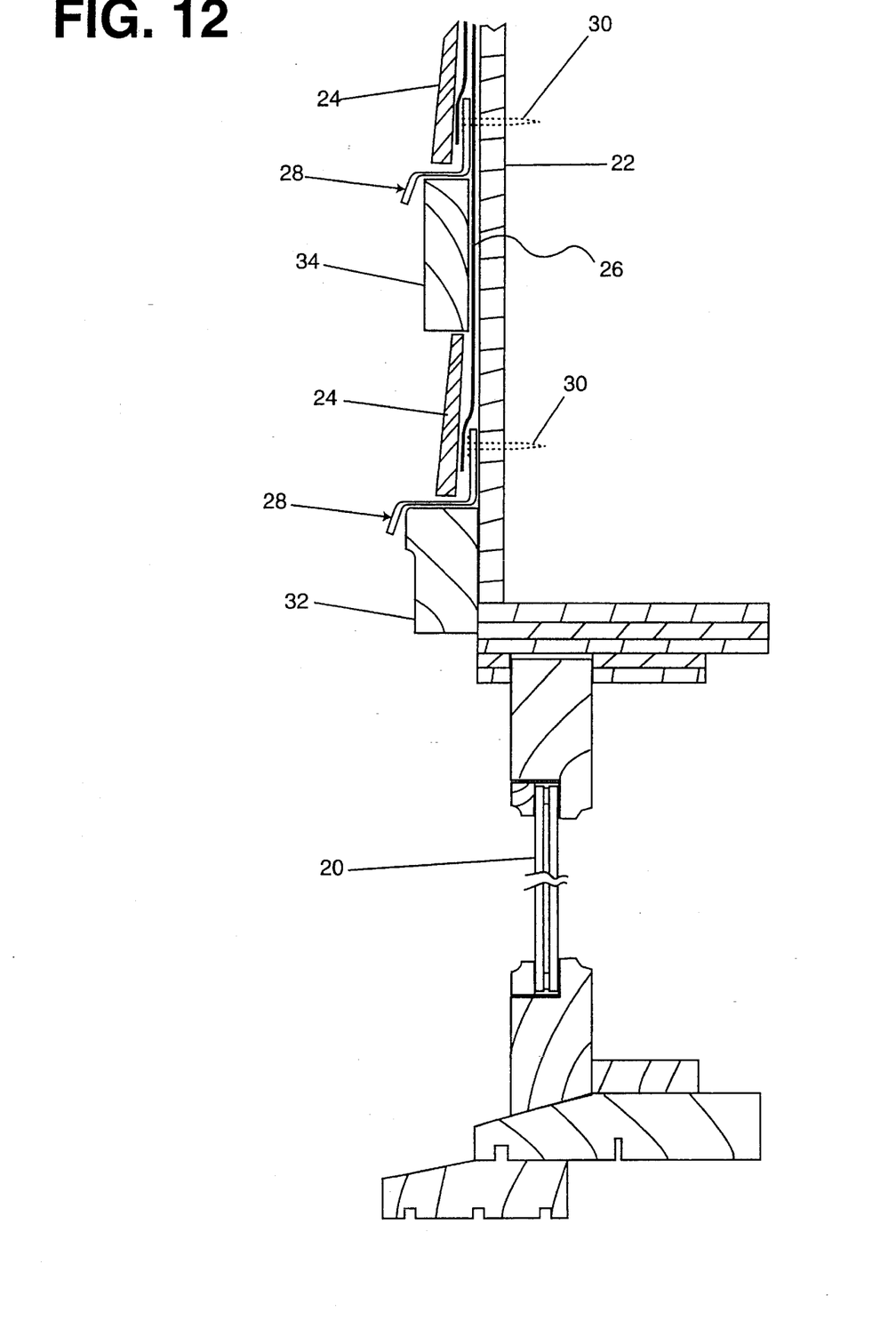
FIG. 12 is a side sectional view of the drip cap installation of FIG. 9.
Figures 13, 17:
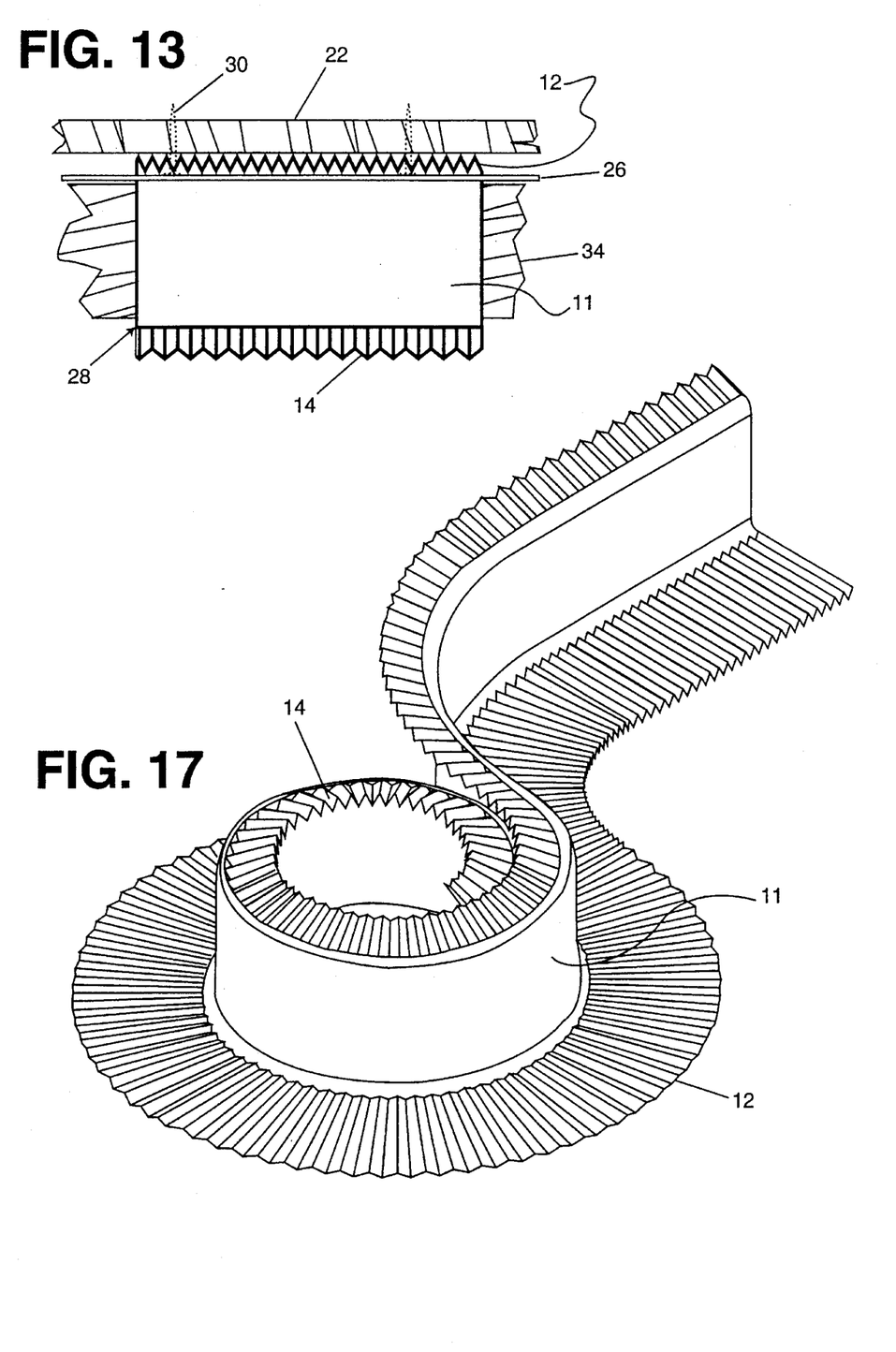
FIG. 13 is a top view of the drip cap installation of FIG. 9.
FIG. 17 illustrates how the newly-formed drip cap material is coiled.

Installing the bendable drip cap over a rounded window (20) (such as shown in FIGS. 11 to 13) is simple, as the appropriate length of drip cap material can be cut to size, manually bent into place and nailed onto the sheathing (22) of the building before siding (24) is installed. Nail holes can be punctured easily in the larger flange of the drip cap material, particularly if a typical vinyl siding type material is used. The figures illustrate that the outer corrugations expand and the inner corrugations compress to provide a flush fit of both the central strip and the larger flange to the adjacent surfaces. The smaller flange makes a small angle to the adjacent surface, as discussed above. As shown in FIGS. 11 to 13, separate sections (28) of drip cap are installed over the brick molding (32) and decorative board (34) with nails (30) fastened through large flanges (14). Galvanized or copper nails, staples or screws can be used for these attachment means. After the drip cap material is installed, building paper (26) is preferably applied over the sheathing (22) and drip caps (28) before siding (24) is installed.

The bendable drip cap can of course be installed over straight window or door frames or the like without bending, and while this may not require the bendable properties of the materials of the present invention, the advantage obtained is that the same material can be used for straight, polygonal and curved architectural projections and can be coiled for convenient storage and transport.

The bendable drip cap materials of the invention can be fabricated by any suitable industrial process of thermoplastic polymeric materials such as polyvinyl chloride or other materials suitable for exterior construction. The material should be resistant to heat, moisture, ultraviolet light and other solar rays, and should have physical properties which make it easy to cut, saw and nail. The drip cap materials will typically be fabricated from strips which are produced by cutting from sheets and/or extrusion, and can then be molded or formed to produce the corrugated flanges of the proper size, orientation and corrugation characteristics. The materials can have any suitable thickness, preferably from about 0.02 to about 0.1 inch, most preferably about 1/32 inch. Optionally, as the drip cap is installed, prepositioned nail holes can be emplaced in the larger flanges by any suitable means.

The vinyl or other polymer can be pigmented by any suitable means so that the finished material has an appropriate color, e.g. white, brown, black or almond. Custom colors could also be produced, but if particular colors are required it is more economical to produce paintable drip cap materials by using plastic with a rougher surface or by treating the molded plastic with suitable primers, then paint the drip cap as installed the appropriate color. The drip cap material can be fabricated and coiled in lengths up to about 50 feet for easy storage and transport.

Figures 14, 15, 15A, 16:
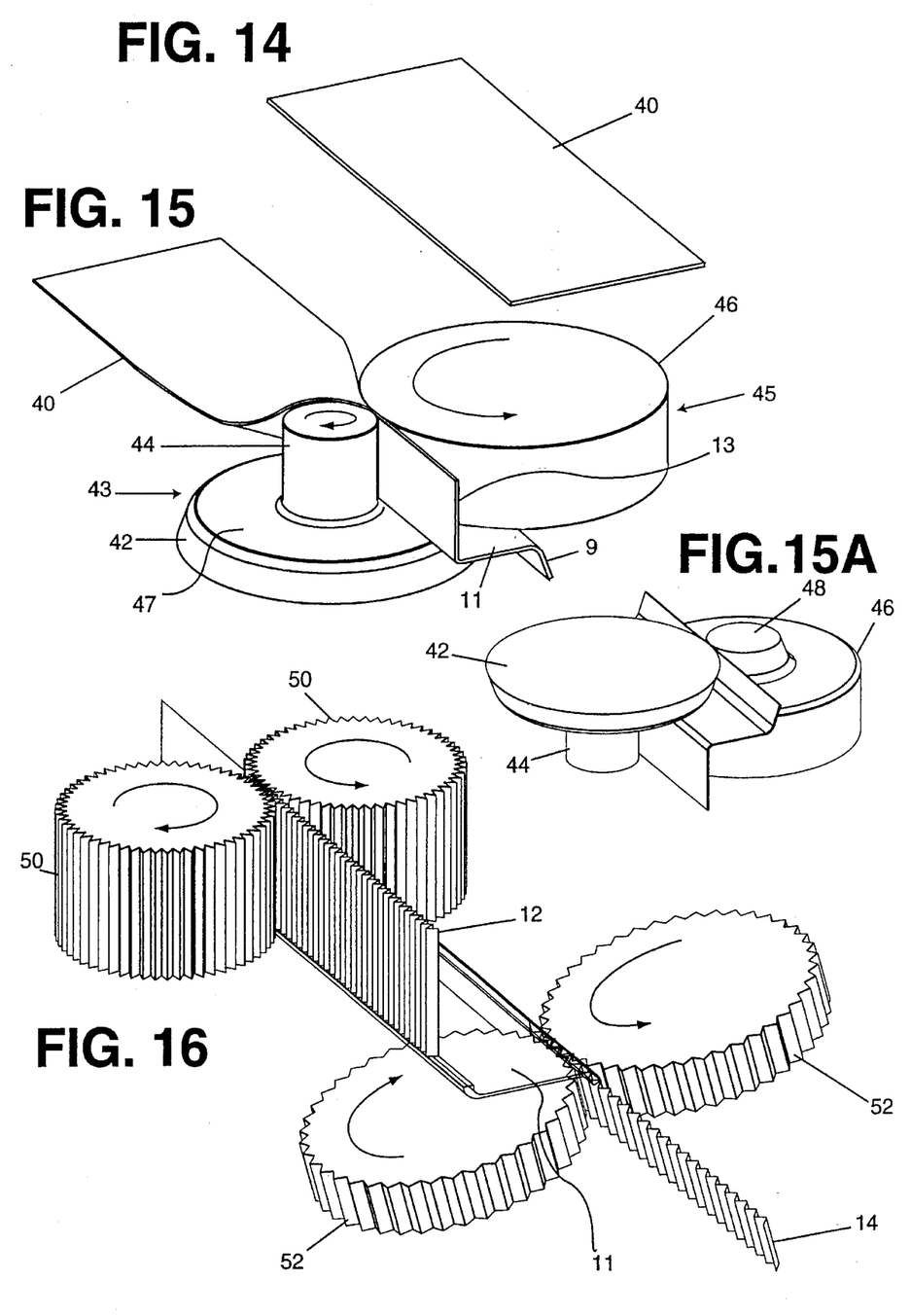
FIG. 14 is a perspective view of a strip of thermoplastic material.
FIG. 15 is a perspective view of the strip of FIG. 14 being passed through interlocking wheels to form the flanges for drip cap material.
FIG. 15A is an inverted perspective view of FIG. 15.
FIG. 16 is a perspective view of a flanged drip cap as formed in FIG. 15 being passed between two sets of interlocking cog wheels to form the corrugations in the flanges.

FIGS. 14 to 16 illustrate one method of producing the drip cap material of the invention. A strip (40) of suitable width and thickness is formed from a suitable thermoplastic polymeric material by suitable means such as extrusion or cutting. After heating by suitable means (not shown) to a suitable softening means, strip (40) is passed between two interlocking wheels (43) and (45). On the left, mandrel (44) forms the larger flange (13) while upper surface (47) of the wheel (43) forms the flat central strip (11) and the angular outer surface (42) of wheel (43) helps form smaller flange (9). Wheel (45) assists in the process by rotating counter to wheel (43) as shown by arrows to draw and form strip (40) between the wheels' components. Large flange (13) is formed between mandrel (44) and the outer surface of wheel (45), the central strip (11) is formed flat between the upper surface (47) of wheel (43) and the lower surface of wheel (45) while the flange (9) is formed and bent at an appropriate obtuse angle to strip (11) by the lower surface of wheel (45), the angular outer surface (42) of wheel (43) and mandrel (48), shown in detail in FIG. 15A. After forming the flanges, the formed strip is reheated or maintained at softening temperature and passed between two sets of contra-rotating interlocking cog wheels (50) and (52) to form the corrugated flanges. The wheels press the softened plastic material between their cogs, forming corrugations of appropriate sizes. The freshly formed drip cap material is then coiled by any suitable means, as shown in FIG. 17, and cut into suitable lengths for storage and shipment.

As an alternative to extrusion and molding as described above, the drip cap materials of the present invention can be produced in sections by reaction injection molding of polyurethane or similar plastics, as described in U.S. Pat. No. 4,563,846, which is incorporated herein by reference. However, it is preferred to produce the drip cap material in lengths which can be coiled conveniently.

The bendable drip cap of the material of the present invention is easy to handle, easy to cut with a knife, tin snips or the like and quick and easy to install. Thus, considerable savings in labor can be achieved over the use of art alternatives. Even homeowners can master the simple installation procedure. Since it is produced in lengths which permit one-piece installations, leakage and water damage is prevented without the necessity of caulking. The polymeric material of the larger flange tends to tighten about the nails as they are driven, further limiting leakage. To prevent any leakage behind the larger flange, it and the adjacent sheathing should be covered with building paper, e.g. tar paper felt or house wrap of polymeric materials such as Tyvek°. The corrugated surface of the smaller, outer flanges provide a non-glare inconspicuous appearance which complements the siding and architectural features.

The invention is further illustrated by the following non-limiting examples:

HYPOTHETICAL EXAMPLES

A bendable drip cap of the invention is installed over a wood "circlehead" window matching a casement window by measuring the circumference of the half-round top of the window, cutting a corresponding length of the polyvinyl chloride material, pressing the material into shape corresponding to the top of the window and nailing in place. If the material will not stay bent into shape, it is usually preferable to nail one end in place after cutting, then progressively bend and restrain in position while nailing successive sections into place until the material is securely installed.

A bendable drip cap of the invention is installed over the rounded frame for French doors or the like in a similar manner. The rounded top of the door frame can be an arc of a circle larger than the width of the door, but the drip cap can be easily bent and nailed into position regardless of the degree of curvature.

A bendable drip cap of the invention is installed over the upper portion of a hexagonal window frame as described above, being bent at each angle to fit the straight portions of the frame snugly.

As described above, the bendable drip cap of the present invention provides a number of advantages, some of which have been described above and others of which are inherent in the invention. Various modifications can be proposed to this drip cap without departing from the teachings herein. Accordingly, the scope of the invention is only to be limited as required by the appended claims.

What is claimed is:

1. A bendable drip cap stripping comprising:
   a central strip; and
   a pair of corrugated flanges integral with respective opposite edges of said central strip and projecting in substantially opposite directions at angles of at least about 90 degrees;
   wherein said central strip and said pair of corrugated flanges cooperate to allow said bendable drip cap stripping to bend; and
   wherein one of said pair of corrugated flanges has the capability of expanding while the other of said pair of corrugated flanges contracts when said drip cap stripping is bent.

2. The bendable drip cap stripping according to claim 1 wherein said bendable drip cap stripping is made of a flexible, resilient material.

3. The bendable drip cap stripping according to claim 2 wherein said bendable drip cap stripping has the capability of being bent and helically coiled upon itself wherein successive coils of said drip cap stripping abut each other.

4. The bendable drip cap stripping according to claim 3 wherein successive coils of a respective corrugated flange interlock.

5. The bendable drip cap stripping according to claim 1 wherein said pair of corrugated flanges comprises first and second corrugated flanges, wherein said first flange has larger corrugations than said second flange.

6. The bendable drip cap stripping according to claim 5 wherein said second corrugated flange is wider than said first corrugated flange.

7. The bendable drip cap stripping according to claim 6 wherein said second corrugated flange is adapted to be attached to a substantially vertical surface.

8. The bendable drip cap stripping according to claim 7 wherein the first corrugated flange projects at an obtuse angle to said central strip.

9. The bendable drip cap stripping according to claim 1 wherein said bendable drip cap stripping is adapted to surround a portion of an architectural feature.

10. The bendable drip cap stripping to claim 9 wherein said architectural feature is a window frame.

11. The bendable drip cap stripping according to claim 10 wherein the portion of said window frame is curved.

12. The bendable drip cap stripping according to claim 9 wherein said architectural feature is a door frame.

13. The bendable drip cap stripping according to claim 12 wherein the portion of said door frame is curved.

14. The bendable drip cap stripping according to claim 9 wherein the portion of said architectural feature further comprises an outwardly extending projection.

15. The bendable drip cap stripping according to claim 1 wherein said central strip has a width in the range of from about ½ to 2 inches.

16. The bendable drip cap stripping according to claim 1 wherein said bendable drip cap stripping is fabricated of thermoplastic polymeric material.

17. The bendable drip cap stripping according to claim 16 wherein said polymeric material is polyvinyl chloride.

18. The bendable drip cap stripping according to claim 16 wherein said polymeric material is a polyurethane.

19. The method of installing onto a vertical surface surrounding an architectural feature a bendable drip cap stripping, which includes a central strip and a pair of corrugated flanges integral with respective opposite edges of said central strip and projecting in substantially opposite directions, said method comprising:
   a.) cutting a length of bendable drip cap stripping;
   b.) attaching one of said pair of corrugated flanges to the vertical surface at one end of the architectural feature;
   c.) bending the drip cap stripping around said architectural feature such that corrugations on either of said flanges expands while corrugations of the other of said flanges contract;
   d.) further attaching the one of said pair of corrugated flanges to the vertical surface surrounding the architectural feature; and
   e.) progressively bending and attaching the drip cap stripping along the length;
   wherein said central strip projects substantially perpendicularly away from said vertical surface.

20. A method of installing onto a vertical surface surrounding an architectural feature a bendable drip cap made of a flexible, resilient material, said drip cap including a central strip and first and second corrugated flanges integral with respective edges of said central strip and projecting in substantially opposite directions, wherein said first flange has larger corrugations than said second flange, said method comprising:
   a.) cutting a length of bendable drip cap stripping;
   b.) attaching the second corrugated flange to the vertical surface at one end of the architectural feature;
   c.) bending the drip cap stripping around said architectural feature such that corrugations on the second flange expands while corrugations of the first flange contract;
   d.) further attaching the second flange to the vertical surface surrounding the architectural feature; and
   e.) progressively bending and attaching the drip cap stripping along the length; wherein said central strip projects substantially perpendicularly away from said vertical surface.

21. The method according to claim 20 wherein the drip cap is uncoiled before being cut.

22. The method according to claim 20 wherein the first corrugated flange projects at an obtuse angle to said central strip thereby defining a path for transporting liquids away from the vertical surface or the architectural feature.

23. The method according to claim 20 wherein said second corrugated flange is wider than said first corrugated flange.

* * * * *